(12) United States Patent
Hara et al.

(10) Patent No.: US 9,190,084 B1
(45) Date of Patent: Nov. 17, 2015

(54) THERMAL ASSISTED MAGNETIC RECORDING HEAD WITH PROTRUSION ON LEADING SIDE OF PLASMON GENERATOR

(71) Applicants: TDK Corporation, Tokyo (JP); SAE Magnetics (H.K.) Ltd., Hong Kong (CN)

(72) Inventors: Kenta Hara, Tokyo (JP); Kosuke Tanaka, Tokyo (JP); Tetsuya Roppongi, Tokyo (JP); Ryuji Fujii, Hong Kong (CN); Yasutoshi Fujita, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 13 days.

(21) Appl. No.: 14/277,374

(22) Filed: May 14, 2014

(51) Int. Cl.
  *G11B 5/60* (2006.01)
  *G11B 5/48* (2006.01)
  *G11B 5/31* (2006.01)

(52) U.S. Cl.
  CPC ............ *G11B 5/4866* (2013.01); *G11B 5/3169* (2013.01); *G11B 5/6082* (2013.01)

(58) Field of Classification Search
  CPC ... G11B 5/4866; G11B 5/6082; G11B 5/3169
  USPC .................. 360/125.3, 317; 369/13.01, 13.33
  See application file for complete search history.

(56) References Cited

U.S. PATENT DOCUMENTS

| 8,427,927 | B1 | 4/2013 | Chou et al. | |
| 8,514,673 | B1* | 8/2013 | Zhao et al. | 369/13.33 |
| 8,810,947 | B1* | 8/2014 | Ren et al. | 360/59 |
| 8,873,353 | B1* | 10/2014 | Riddering | 369/13.33 |
| 2003/0066944 | A1 | 4/2003 | Matsumoto et al. | |
| 2010/0103553 | A1 | 4/2010 | Shimazawa et al. | |
| 2010/0157745 | A1 | 6/2010 | Okada et al. | |
| 2010/0172220 | A1* | 7/2010 | Komura et al. | 369/13.33 |
| 2010/0202081 | A1* | 8/2010 | Shimazawa et al. | 360/59 |
| 2011/0235478 | A1* | 9/2011 | Komura et al. | 369/13.24 |
| 2012/0050906 | A1 | 3/2012 | Balamane et al. | |
| 2013/0044575 | A1* | 2/2013 | Mori et al. | 369/13.26 |

(Continued)

FOREIGN PATENT DOCUMENTS

| JP | 10-162444 A | 6/1998 |
| JP | 2001-255254 A | 9/2001 |
| JP | 2004-158067 A | 6/2004 |

*Primary Examiner* — Angel Castro
(74) *Attorney, Agent, or Firm* — Posz Law Group, PLC

(57) ABSTRACT

A thermal assisted magnetic recording head of the present invention has an air bearing surface (ABS) opposite to a magnetic recording medium, a core that can propagate laser light as propagating light, a plasmon generator that includes a generator front end surface facing the ABS, and a main pole that faces the ABS and emits magnetic flux to the magnetic recording medium. The plasmon generator is opposite to a part of the core and extends to the generator front surface, is coupled with a portion of the propagating light that propagates through the core in the surface plasmon mode to generate a surface plasmon, propagates the surface plasmon to the generator front end surface, and generates near-field light (NF light) at the generator front end surface to irradiate the NF light to the magnetic recording medium. The ABS has a protrusion that is closer to the leading side than the generator front end surface in the down track direction, and that protrudes more toward the magnetic recording medium than the generator front end surface upon operation of the thermal assisted magnetic recording head.

17 Claims, 8 Drawing Sheets

(56) References Cited

U.S. PATENT DOCUMENTS

| | | | |
|---|---|---|---|
| 2013/0091695 A1* | 4/2013 | Shimazawa et al. | 29/601 |
| 2013/0286805 A1* | 10/2013 | Macken et al. | 369/13.33 |
| 2014/0269819 A1* | 9/2014 | Kiely et al. | 374/45 |
| 2015/0199987 A1* | 7/2015 | Canchi et al. | 369/13.33 |

* cited by examiner

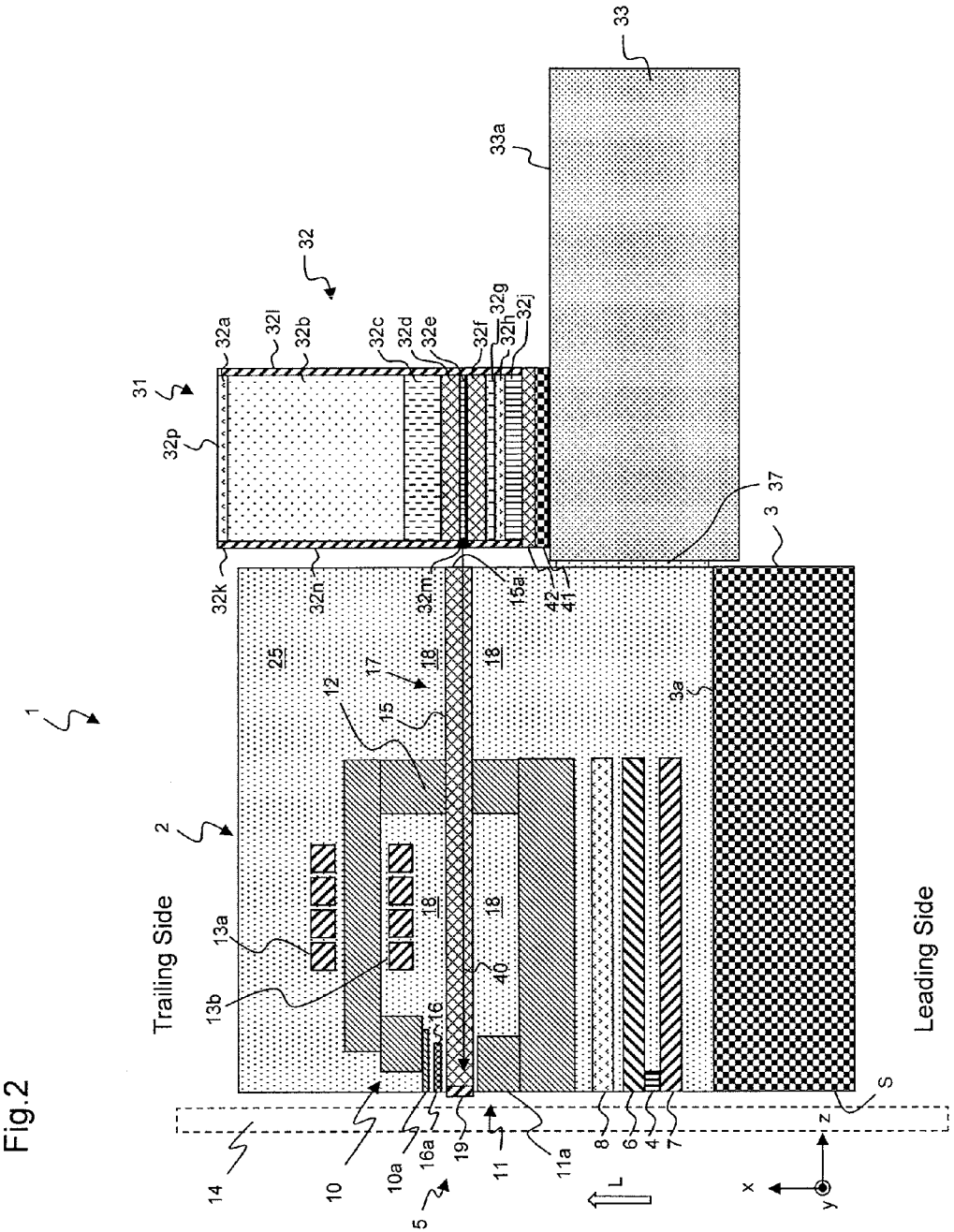

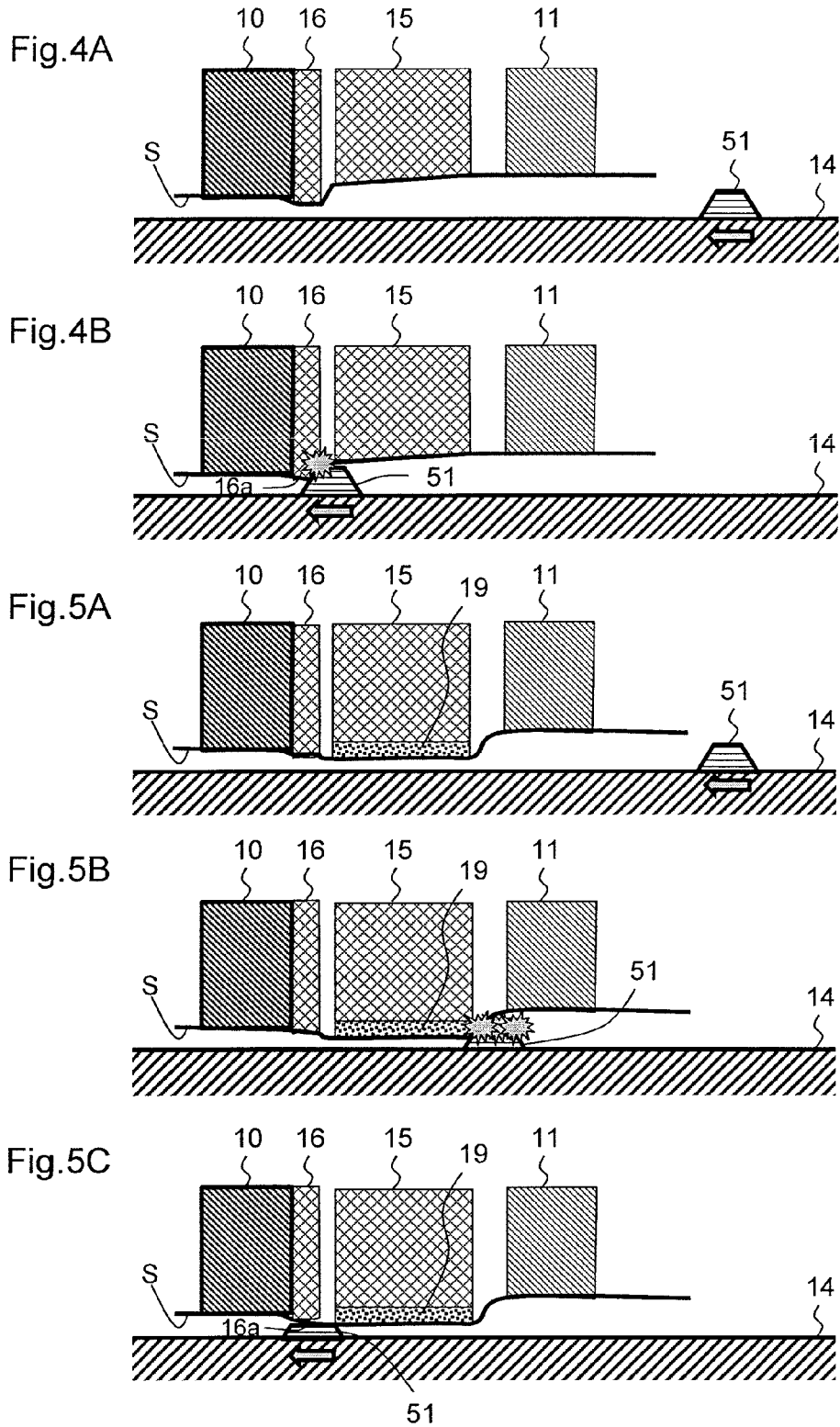

THERMAL ASSISTED MAGNETIC RECORDING HEAD WITH PROTRUSION ON LEADING SIDE OF PLASMON GENERATOR

BACKGROUND OF THE INVENTION

1. Field of the Invention

The present invention relates to a thermal assisted magnetic recording head, and it particularly relates to a thermal assisted magnetic recording head using a plasmon generator.

2. Description of the Related Art

Recently, in a magnetic recording device typified by a magnetic disk device, in association with high recording density, there is a demand for improvement in performance of thin film magnetic heads and magnetic recording media. As the thin film magnetic head, composite-type thin film magnetic heads are widely used in which a reproducing head having a magneto-resistive effect element (MR element) for reading, and a recording head having an induction-type electromagnetic transducer element for writing, are laminated on a substrate.

The magnetic recording medium is a discontinuous medium where magnetic grains are aggregated, and each magnetic grain has a single magnetic domain structure. Each recording bit on the magnetic recording medium is configured by a plurality of magnetic grains. In order to increase the recording density, asperities at the border between adjacent recording bits need to be decreased by decreasing the size of the magnetic grains. On the other hand, decreasing the size of the magnetic grains, i.e., decreasing in the volume of the magnetic grains, results in a decrease in the thermal stability of magnetization in the magnetic grains. In order to resolve this problem, it is effective to increase the anisotropic energy of the magnetic grains. However, the increased anisotropic energy of the magnetic grains enhances the coercive force of the magnetic recording medium, making it difficult to record the information by an existing magnetic head.

As a method for resolving this problem, so-called thermal assisted magnetic recording is proposed. In this method, a magnetic recording medium with a high coercive force can be used. At the time of recording information, the simultaneous addition of a magnetic field and heat to a portion of the recording medium where the information will be recorded increases the temperature of that portion. This results in information being recorded by the magnetic field at the portion where the coercive force is decreased. Hereafter, the magnetic head used for thermal assisted magnetic recording is referred to as a thermal assisted magnetic recording head (TAMR head).

In thermal assisted magnetic recording, a laser light source is commonly used for heating a magnetic recording medium. As heating methods, a method to heat a magnetic recording medium with laser light (direct heating) and a method to convert the laser light into near-field light (NF light) to heat a magnetic recording medium (NF light heating) are known.

As an example of direct heating, in JP H10-162444, a head using a solid immersion lens for an optical magnetic disk is disclosed. The head forms a super fine optical beam spot on an optical magnetic disk, and records a signal in a super fine magnetic domain.

As an example of NF light heating, in JP 2001-255254, an NF light probe used for optical recording, i.e., a so-called plasmon antenna is disclosed. The NF light probe is configured with a metallic scatterer in the shape of a conical body or film-like triangle formed on a substrate, and a film such as a dielectric body formed around the scatterer, and generates NF light from plasmon excited by light. The NF light is a type of so-called electromagnetic field formed around the periphery of a material, and diffraction limitations due to the wavelength of the light can be ignored. By irradiating a microstructure with light having the same wavelength, NF light depending upon the scale of the microstructure is formed, and it is even possible to focus light onto a very small domain on the order of tens of nm.

In JP 2004-158067, an NF light probe used for a single magnetic pole type perpendicular magnetic recording head is disclosed. The NF light probe is a scatterer made of gold, and is formed perpendicular to the magnetic recording medium contacting the main pole.

One of the problems with the TAMR head is the reliability of the plasmon antenna against heat. As described in JP 2001-255254 and JP 2004-158067, when light is directly irradiated to the plasmon antenna, the temperature of the plasmon antenna drastically rises, and the thermal reliability decreases. In US2010/0103553, instead of directly irradiating the plasmon antenna with light propagating through the core, a technology is disclosed in which the surface plasmon is excited at a plasmon generator adjacent to the core via a buffer layer. The propagating light is coupled with a plasmon generator in a surface plasmon polariton mode, and excites the surface plasmon at the plasmon generator. Specifically, evanescent light which penetrates the buffer layer is generated at an interface by the total reflection of the light propagating through the core at the interface of the core and the buffer layer. Collective vibration of electric charges in the plasmon generator, i.e., surface plasmon, is coupled with the evanescent light, and the surface plasmon is excited at the plasmon generator. The surface plasmon excited at the plasmon generator propagates to the generator front end surface via a propagation edge, and generates NF light at the generator front end surface. According to this technology, because light that propagates through the core is not directly irradiated to the plasmon generator, it is possible to prevent an excessive temperature increase at the plasmon generator. Such a plasmon generator is referred to as a surface evanescent light coupling type NF light generator.

However, in current TAMR, deterioration of recording characteristics (such as the S/N ratio) in association with continuous recording has been confirmed. As the main factor, agglomeration of the generator front end surface of the plasmon generator is recognized. The agglomeration is a phenomenon where metal atoms gather, and it occurs as a result of diffusion and movement of the metal atoms using heat and stress as the driving force. Asperities exist on an air bearing surface of the magnetic head slider and a surface of the magnetic recording medium, and the generator front end surface of the plasmon generator may make contact with the magnetic recording medium during the operation of the magnetic recording device. The temperature increase and stress increase due to the impact occurring at this time cause the agglomeration. In general, because metal formed by sputtering or a plating method has low density, the density is gradually increased due to heat or stress, and the volume is easily reduced. Since the plasmon generator is normally formed by sputtering, agglomeration and a recess from the air bearing surface in association with the agglomeration easily occur. As a result, the distance between the plasmon generator and the magnetic recording medium is increased, and the capability to heat the magnetic recording medium decreases over time, causing the deterioration of the S/N ratio. Therefore, it is desirable to suppress the agglomeration of the plasmon generator in order to secure the reliability of the TAMR head.

The object of the present invention is to provide a TAMR head with high reliability where the agglomeration of the generator front end surface of the plasmon generator rarely occurs, and a manufacturing method thereof.

SUMMARY OF THE INVENTION

The thermal assisted magnetic recording head of the present invention has an air bearing surface (ABS) opposite to a magnetic recording medium, a core that can propagate laser light as propagating light, a plasmon generator that includes a generator front end surface facing the ABS, and a main pole that faces the ABS and emits magnetic flux to the magnetic recording medium. The plasmon generator is opposite to a portion of the core and extends to the generator front surface, is coupled with a portion of the propagating light that propagates through the core in the surface plasmon mode to generate a surface plasmon, propagates the surface plasmon to the generator front end surface and generates near-field light (NF light) at the generator front end surface to irradiate the NF light to the magnetic recording medium. The ABS has a protrusion that is closer to the leading side than the generator front end surface in the down track direction, and that protrudes more toward the magnetic recording medium than the generator front end surface upon operation of the thermal assisted magnetic recording head.

The magnetic head slider of the thermal assisted magnetic recording head makes contact with a recording medium due to asperities of the ABS and the recording medium. Contact occurs at the leading side of the ABS first, and then at the trailing side. According to the present invention, the convex part of the ABS makes contact with the protrusion, reducing the height of the convex part. The convex part of the ABS then approaches the generator front end surface of the plasmon generator; however, since the height of the convex part is reduced, collision can be avoided or the impact force is reduced even if collision occurs. Therefore, because the heat generation on the generator front end surface of the plasmon generator due to contact with the magnetic recording medium is reduced and a possibility of deformation due to the collision is reduced, agglomeration of the generator front end surface is suppressed.

The above-mentioned objective and other objective(s), characteristics and advantages of the present invention would be clarified from the following explanation by referring to attached drawings illustrating the present invention.

BRIEF DESCRIPTION OF THE DRAWINGS

FIG. 2 is a conceptual cross-sectional view of a thermal assisted magnetic recording head relating to one embodiment of the present invention;

FIGS. 4A to 4B are respective schematic views showing a problem in the case when a plasmon generator protrudes;

FIGS. 5A to 5C are respective schematic views showing an effect of the protrusion;

DETAILED DESCRIPTION OF THE INVENTION

Figure 1:
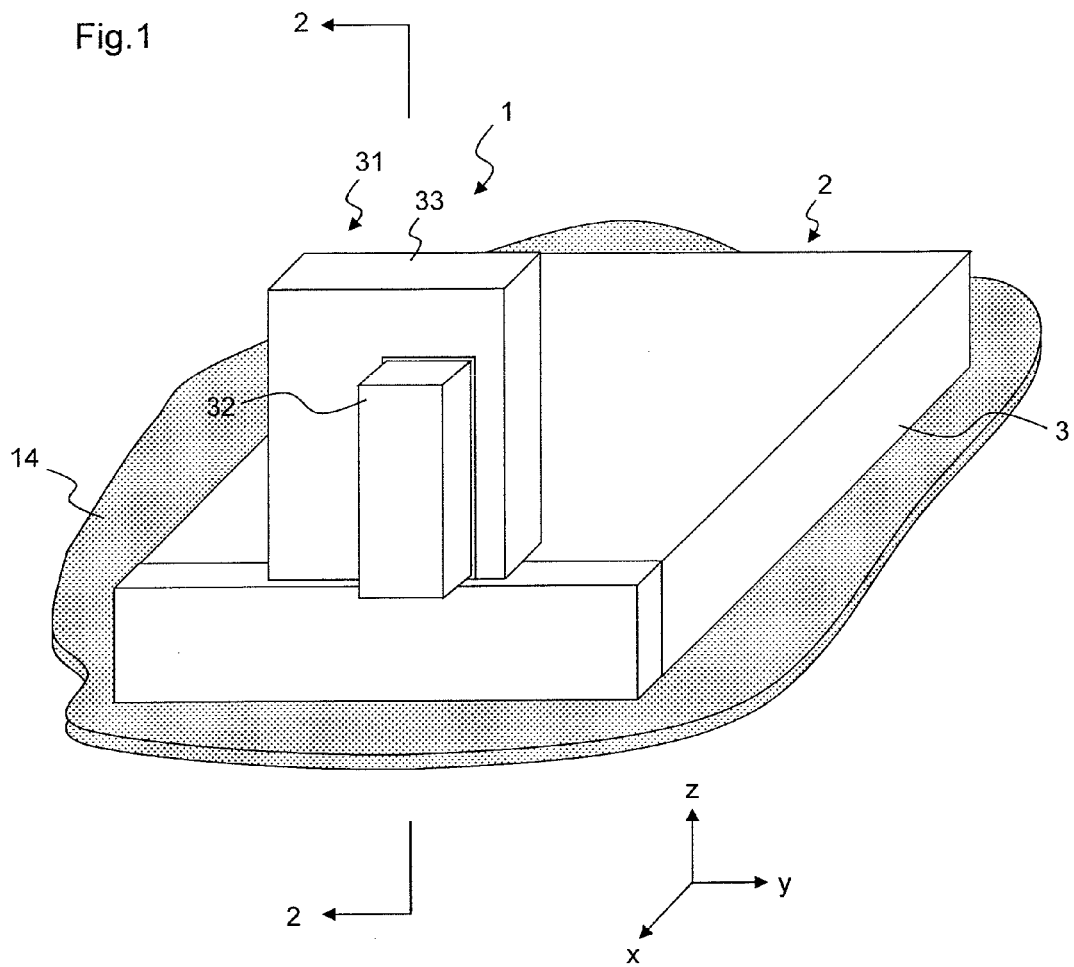
FIG. 1 is an overall perspective view of the thermal assisted magnetic recording head.
Figure 3A:
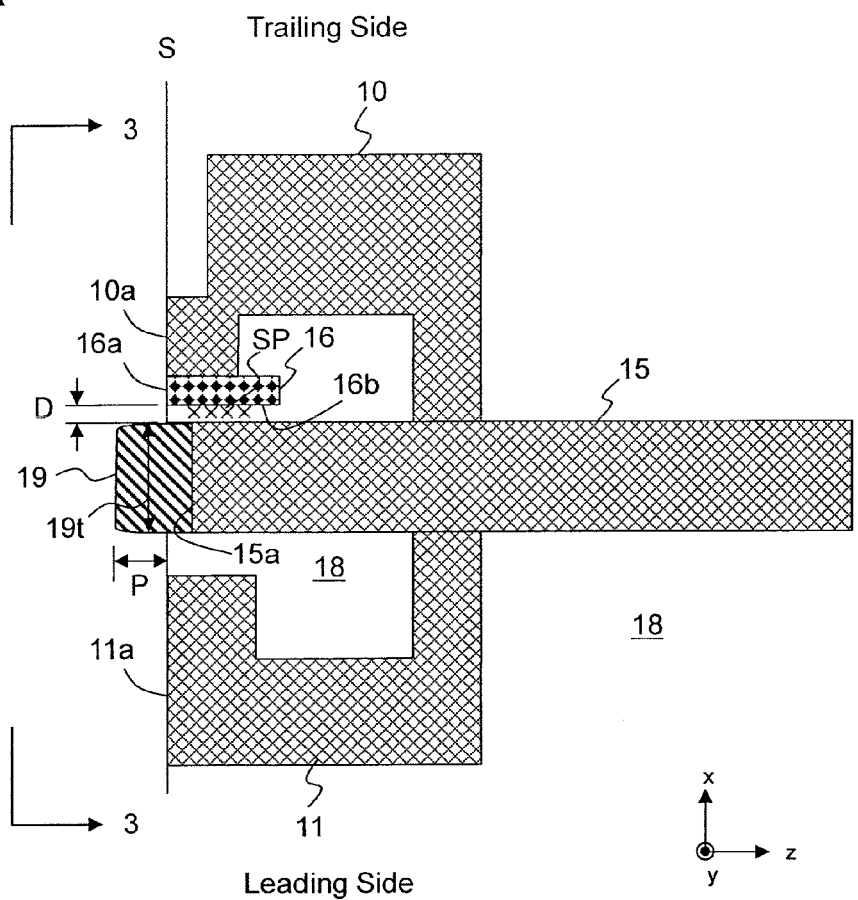
FIG. 3A is a conceptual cross-sectional view of main parts of the thermal assisted magnetic recording head shown in FIG. 2.
Figure 3B:
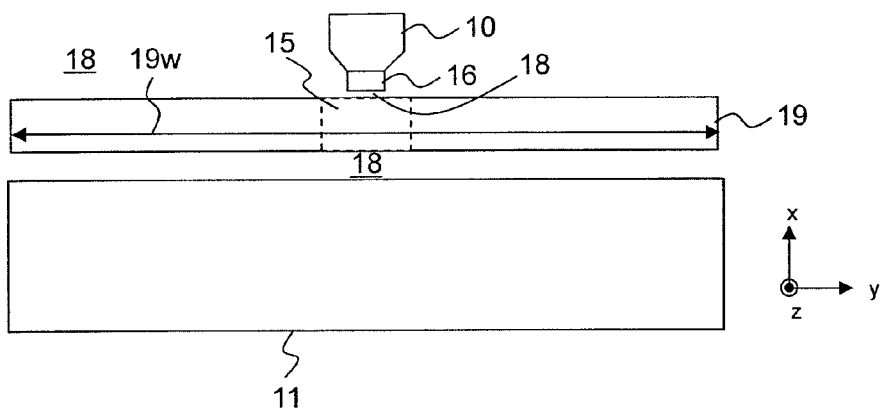
FIG. 3B is a conceptual view showing an air bearing surface (ABS) of the main parts of the them al assisted magnetic recording head shown in FIG. 3A.

First, a configuration of the thermal assisted magnetic recording head relating to one embodiment of the present invention is explained. FIG. 1 is an overall perspective view of the thermal assisted magnetic recording head. FIG. 2 is an overall perspective view of the thermal assisted magnetic recording head cut along the line 2-2 of FIG. 1. FIG. 3A is a cross sectional view cut along the line 2-2 of FIG. 1 schematically showing a plasmon generator, a core, a main pole and a leading shield. FIG. 3B is a main part schematic view of the ABS viewed from the line 3-3 of FIG. 3A.

In the specification, the x direction means a down track direction, or a direction that is orthogonal to an integrated surface $3a$ of a substrate 3 where a magneto resistive (MR) element, a magnetic recording element and the like are formed, and corresponds to a recording medium circumferential direction. The y direction means a cross track direction of a magnetic recording medium 14, and corresponds to a recording medium radius direction. The z direction means a direction that is orthogonal to an air bearing surface S of a magnetic head slider. The x direction is matched with a film formation direction L in the wafer process. The x direction, the y direction and the z direction are orthogonal to each other. "Upward" and "downward" mean a direction away from a substrate and a direction approaching the substrate relative to the x direction, respectively. "Trailing side" may be used instead of "upward", and "leading side" may be used instead of "downward".

A magnetic head 1 has a magnetic head slider 2 and a laser diode unit 31 that is affixed to the magnetic head slider 2 and emits laser light.

The magnetic head slider 2 has substantially formed in a hexahedral shape, one surface of which configures the air bearing surface S opposite to the magnetic recording medium 14. The magnetic head slider 2 has an MR element 4, a magnetic recording element 5, a waveguide 17 that includes a core 15 that can propagate laser light emitted from the laser diode unit 31 as propagating light, and a plasmon generator 16 that generates NF light at the air bearing surface S from the propagating light. These elements are formed on the substrate 3 made of ALTiC ($Al_2O_3$—TiC).

The magnetic recording element 5 has a main pole 10 for perpendicular magnetic recording that faces the air bearing surface S. The main pole 10 is provided adjacent to the plasmon generator 16. A main pole end surface $10a$, which is an end part of the main pole 10, is positioned on the air bearing surface S, and generates a magnetic field for recording at the air bearing surface S. A leading shield 11 is provided at the leading side of the main pole 10 in the down track direction x. The leading shield 11 is magnetically linked with the main pole 10 via a contact part 12, and configures an integrated magnetic circuit along with the main pole 10. The leading shield 11 has a shield end surface 11a facing the air bearing surface S. Coils 13a and 13b are wound around the main pole 10 to set the contact part 12 as the center. The main pole 10, the leading shield 11 and the contact part 12 are formed with an alloy made of any of two or three of Ni, Fe and Co. An overcoat layer 25 made of $Al_2O_3$ is provided upward of the magnetic recording element 5 in the x direction.

Magnetic flux generated inside the main pole 10 is emitted from the main pole end surface 10a toward the magnetic recording medium 14 as magnetic flux for writing. The magnetic flux emitted from the main pole end surface 10a enters into the magnetic recording medium 14, and magnetizes each recording bit in the perpendicular direction z. The magnetic flux changes its magnetic path to the in-plane direction (x direction) of the magnetic recording medium 14, and again changes its orientation to the perpendicular direction (z direction) in the vicinity of a leading shield 11, and is then absorbed by the leading shield 11 from the shield end surface 11a.

The magnetic head slider 2 has a waveguide 17 that can propagate laser light. The waveguide 17 is positioned closer to the leading side in the down track direction than the plasmon generator 16. The waveguide 17 has a core 15 extending in the z direction and a cladding 18 covering the core 15. The core 15 propagates laser light generated at the laser diode unit 31 as propagating light 40 in the z direction. The core 15 extends from an end portion 15a (incident end surface of laser beam) opposite to the laser diode unit 31 of the magnetic head slider 2 to the vicinity of the air bearing surface S. A cross section of the core 15 orthogonal to the propagation direction (z direction) of the propagating light 40 is rectangular, and the width (dimension in the y direction) is greater than the thickness (dimension in the x direction). The core 15 may be formed with, for example, TaOx. TaOx means tantalum oxide with any composition, of which $Ta_2O_5$, TaO, $TaO_2$ and the like are typical, but is not limited to these. The core 15 is covered with the cladding 18, which has a smaller refractive index than the core 15. The cladding 18 can be formed with a dielectric body of, for example, $SiO_2$, $Al_2O_3$ and the like.

The magnetic head slider 2 has an MR element 4, a front end of which is positioned on the air bearing surface S, and an upper part shield layer 6 and a lower part shield layer 7 that are respectively provided at both sides of the MR element 4 in the x direction. The MR element 4 is a reproducing element that reads information recorded on the magnetic recording medium, and may be any of a Current In Plane (CIP)-Gigantic Magneto Resistive (GMR) element where a sense current flows in the y direction, a Current Perpendicular to Plane (CPP)-GMR element where a sense current flows in the x direction, and a Tunneling Magneto Resistive (TMR) element where a sense current flows in the x direction and that utilizes a tunnel effect. When the MR element 4 is a CPP-GMR element or a TMR element, the upper side shield layer 6 and the lower side shield layer 7 are also utilized as electrodes that supply a sense current. A magnetic shield layer 8 is provided between the MR element 4 and the magnetic recording element 5.

The magnetic head slider 2 has a plasmon generator 16 that generates NF light at the air bearing surface S from the propagating light 40. The plasmon generator 16 includes a generator front end surface 16a facing the air bearing surface S, and extends to the generator front end surface 16a opposite to a portion of the core 15 along the core 15. The main pole end surface 10a is positioned in the vicinity of the generator front end surface 16a. The plasmon generator 16 is coupled with a portion of the propagating light 40 that propagates through the core 15 in the surface plasmon mode to generate a surface plasmon, propagates the surface plasmon to the generator front end surface 16a, and generates NF light at the generator front end surface 16a to irradiate the NF light to the magnetic recording medium 14. With this, the plasmon generator 16 heats a portion of the magnetic recording medium 14 where information is recorded. The plasmon generator 16 is formed with Au, Ag, Cu, Al, Pd, Ru, Pt, Rh, Ir or an alloy that consists primarily of these metals.

In the present embodiment, the plasmon generator 16 is a roughly quadrangular prism shaped metallic strip having a rectangular cross section. Therefore, the generator front end surface 16a is rectangular; however, it may also be square, triangular or the like. Out of four sides of the plasmon generator 16 extending in the z direction, a surface opposite to the core 15 configures the propagation surface 16b. The propagation surface 16b is coupled with the propagating light 40 that propagates through the core 15 in the surface plasmon mode and generates surface plasmon SP. The propagation surface 16b propagates the generated surface plasmon SP up to the generator front end surface 16a of the plasmon generator 16 and generates the NF light at the generator front end surface 16a.

The laser diode unit 31 is positioned opposite to the surface of the magnetic head slider that in turn is opposite to the air bearing surface S. The laser diode unit 31 emits laser light toward the core 15 of the waveguide path 17 of the magnetic head slider 2 in the direction Z that is perpendicular to the air bearing surface S. The laser diode unit 31 is soldered to the magnetic head slider 2 by a bonding layer 37.

The laser diode unit 31 includes a laser diode 32, which is a laser light generating element, and a sub mount 33 where the laser diode 32 is mounted. The laser diode 32 supplies laser light to the core 15. The sub mount 33 is made of a Si substrate and the like. The laser diode 32 is mounted onto a mounting surface 33a of the sub mount 33. Specifically, a first electrode (p electrode) 32j of the laser diode 32 is affixed to a pad 41 that is provided at the mounting surface 33a of the sub mount 33 with a solder material 42.

The laser diode 32 is an edge emitting type, and one that is normally used for communication, for optical system disk storage or for material analysis, such as an InP-series, a GaAs-series or a GaN-series. Although the wavelength of the laser light to be emitted is not particularly limited, a wavelength within the range of 375 nm to 1.7 μm can be utilized, and, in particular, a wavelength around 650 to 900 nm is preferably used.

The laser diode 32 is not limited to the following configuration, but in one example, it is configured such that an n electrode 32a configuring a second electrode, an n-GaAs substrate 32b, an n-InGaAlP cladding layer 32c, a first InGaAlP guide layer 32d, an active layer 32e made of a multiquantum well (InGaP/InGaAlP), a second InGaAlP guide layer 32f, a p-InGaAlP cladding layer 32g, a p electrode under layer 32h, and a p electrode 32j configuring a first electrode are sequentially laminated. Reflective layers 32k and 32l for exciting oscillation due to total reflection are formed in front of and behind a cleavage surface of the laser diode 32. A surface of the reflective layer 32k, i.e., a surface of the laser diode 32 opposite to the magnetic head slider 2 configures a light-emitting surface 32n of the laser diode 32. An emission center 32m exists at the position of the active layer 32e of the reflective layer 32k. The n electrode 32a and the p electrode 32j can be formed with Au or an Au alloy with a thickness of approximately 0.1 μm. When a hard disk device is operated, electricity is supplied to the laser diode 32 from a light source inside the hard disk device via the first electrode 32j and the second electrode 32a.

As shown in FIGS. 3A and 3B, the air bearing surface S has a protrusion 19 that protrudes more toward the magnetic recording medium 14 than the generator front end surface 16a at the time of operating the thermal assisted magnetic recording head. The protrusion 19 is provided closer to the leading side than the generator front end surface 16a in the down track direction, and in the present embodiment, the protrusion 19 passes on a surface 15a of the core 15 opposite to the magnetic recording medium 14, and extends on both sides of the surface 15a in the cross track direction. The protrusion 19 has rail-state shape extending in the cross track direction. The thickness (dimension in the x direction) of the protrusion 19 is approximately 50 nm in one example, but it is not limited to this. The protrusion 19 protrudes toward the magnetic recording medium 14 by 0.5 to 2 μm more than the generator front end surface 16a when the thermal assisted magnetic recording head is operated (in the figure, see the protrusion length P).

It is advantageous to provide the protrusion 19 for the following reasons. Asperities exist on the magnetic recording medium 14 with a certain probability, and the convex part collides with the air bearing surface S of the magnetic head slider 2 with a certain probability. FIGS. 4A and 4B schematically show the state in which the convex part 51 on the rotating magnetic recording medium 14 approaches and collides with the magnetic head. The protrusion 19 is not provided at the front end of the core 15. The plasmon generator 16 protrudes more toward the magnetic recording medium 14 than the core 15. This is because the plasmon generator 16 itself produces heat and causes thermal expansion due to thermal energy of the propagating light 40 of the core 15, and protrudes toward the magnetic recording medium 14 (FIG. 4A).

When the convex part 51 is within a certain range of height, the convex part 51 approaches the plasmon generator 16 without colliding with the core 15. Consequently, the convex part 51 directly collides against the plasmon generator 16 (FIG. 4B). At this time, great stress and high temperature are instantaneously generated, and the plasmon generator 16 is deformed. This deformation causes the agglomeration on the generator front end surface 16a of the plasmon generator 16. Even when the convex part 51 does not collide with the plasmon generator 16 but collides with the main pole 10, the stress and high temperature occurring at the main pole 10 propagate to the plasmon generator 16, and the plasmon generator 16 receives a similar impact to when the convex part 51 directly collides against the plasmon generator 16. Therefore, it is also desirable to avoid mechanical collision between the main pole 10 and the convex part 51, and it is desirable that the protrusion 19 protrudes more toward the magnetic recording medium 14 than the main pole end surface 10a when the thermal assisted magnetic recording head is operated.

With reference to FIGS. 5A to 5C, the protrusion 19 protrudes more than the main pole 10 and the plasmon generator 16. The convex part 51 collides with the protrusion 19 and is deformed on that occasion, and the height is reduced. In other words, the protrusion 19 becomes a sacrificial part and collides with the convex part 51, and the magnetic recording medium 14 is substantially planarized (FIG. 5B). Then, as the convex part 51 approaches the plasmon generator 16, it passes through the magnetic head without colliding with the plasmon generator 16 and the main pole 10 (FIG. 5C). Because the protrusion 19 collides with the convex part 51 first, direct physical contact between the convex part 51 and the plasmon generator 16 is avoided. Thus, it becomes difficult to generate agglomeration on the generator front end surface 16a of the plasmon generator 16, enhancing thermal reliability of the plasmon generator 16. Consequently, the protrusion 19 protects the plasmon generator 16, and fulfills the role of a so-called bumper.

It is believed that contamination that is adhered to the magnetic recording medium 14 also functions similarly to the asperity on the magnetic recording medium 14. Therefore, an effect of contamination can also be reduced by providing the protrusion 19.

If the protrusion 19 is too close to the plasmon generator 16, the impact that the protrusion 19 receives is easily transmitted to the plasmon generator 16, and the protrusion 19 cannot fulfill the role as a bumper. The space between the plasmon generator 16 and the core 15 is filled with an insulator 18, such as $Al_2O_3$, functioning also as the cladding 18, and the interval is merely approximately 0.03 μm. Therefore, it is not preferable to provide the protrusion 19 between the plasmon generator 16 and the core 15, and it is desirable that the protrusion 19 be separated by a distance of not less than the interval D between the plasmon generator 16 and the core 15, from the generator front end surface 16a in the down track direction. In the meantime, if the protrusion 19 is separated too far from the plasmon generator 16, the protrusion 19 becomes closer to the MR element 4. The MR element 4 is recessed by approximately 2 μm compared to the plasmon generator 16 when the thermal assisted magnetic head is operated, and if the protrusion 19 is provided in this vicinity, the protrusion 19 can no longer fulfill the role as a bumper. From this viewpoint, it is not preferable that the protrusion 19 be situated at a position exceeding 3 μm from the generator front end surface 16a in the down track direction. In light of this, it is desirable that the protrusion 19 be situated at a position of 0.03 to 3 μm from the generator front end surface 16a in the down track direction. In the present embodiment, since the protrusion 19 passes on the surface 15a of the core 15 opposite to the magnetic recording medium 14, it is positioned comparatively closer to the plasmon generator 16; however, as long as the conditions above are fulfilled, the position of the protrusion 19 is not limited.

The protrusion 19 preferably has a Mohs hardness of 5 or more. The Mohs hardness herein means conventional Mohs hardness (10 levels), and does not mean new Mohs hardness (15 levels). The Mohs hardness of the protrusion 19 is higher than Ni (Mohs hardness: approximately 4) and Fe (Mohs hardness: approximately 4), which are main materials of the leading shield 11. Since the leading shield 11 has a comparatively smaller Mohs hardness, peeling easily occurs by repetition of the collision with the convex part 51 of the magnetic recording medium 14. Such peeled pieces of the leading shield 11 are captured between the protrusion 19 positioned at the trailing side and the magnetic recording medium 14, and scrape the surface of the protrusion 19. If the Mohs hardness of a peeled piece is higher than that of the protrusion 19, the protrusion 19 becomes scratched and worn, gradually impairing its function as a bumper. In the meantime, if the Mohs hardness of the protrusion 19 is higher than that of a peeled piece, it is difficult for the protrusion 19 to become worn, and its function as a bumper can be maintained for a long term. The protrusion 19 can be formed from diamond, diamond-like carbon, boron nitride, titanium, vanadium, chrome, zinc, neodymium, molybdenum, hafnium, tantalum, tungsten, or an oxide or nitride of these.

The protrusion 19 preferably has a length 19w of 15 μm or longer in the cross track direction. If the length 19w in the cross track direction is short, the wear of the protrusion 19 occurs sooner, and it is difficult to maintain the function as a bumper for a long term. Further, if the length 19w of the protrusion 19 is 15 µm or longer, it is also effective in a touchdown process to determine a reference point for determination of clearance between the head and the magnetic recording medium 14. The touchdown process is conducted during the operation of the magnetic recording device in order to maintain the clearance within the optimum range. In this process, by activating a flexure, the magnetic head is moved up and down with respect to the magnetic recording medium 14. During this process, the magnetic head collides with the magnetic recording medium 14. In order to accurately determine the reference point, it is necessary to accurately detect the collision. In the present embodiment, the collision is detected when the magnetic head makes contact with the protrusion 19. The protrusion 19, which is long in the cross track direction, has a greater area for making contact with the magnetic recording medium 14 than the main pole 10 and the plasmon generator 16, and easily detects the signal in association with the contact.

Further, the length 19w of the protrusion 19 is preferably 100 µm or less in the cross track direction. As described later, an arm 230 where the thermal assisted magnetic head is attached turns around a shaft 234 attached in a bearing part 233. Consequently, depending upon where the thermal assisted magnetic head is positioned in the radial direction on the magnetic recording medium 14 (inner periphery side or outer periphery side), a skew angle between the track circumferential direction of the magnetic recording medium 14 and the down track direction of the thermal assisted magnetic head is changed. In other words, the direction when the convex part 51 on the magnetic recording medium 14 approaches the protrusion 19 is changed. In order to absorb the change of the approaching direction of the convex part 51, a protrusion 19 that is longer in the cross track direction is advantageous. The length 19w is preferably at least 15 µm, and 100 µm at most is sufficient.

The thermal assisted magnetic recording head of the present embodiment can be formed through the following steps:
(1) On a wafer (substrate 3), the lower part shield layer 7 is formed by a plating method, the MR element 4 is formed by sputtering, and the upper shield layer 6 is formed by a plating method.
(2) The magnetic shield layer 8 is formed by the plating method.
(3) The leading shield 11 is formed by the plating method.
(4) The waveguide 17 made of a three-layer structure of cladding 18/core 15/cladding 18 is formed by sputtering. On this occasion, by removing the end surface of the core 15 on the air bearing surface S side, the protrusion 19 is formed.
(5) The plasmon generator 16 is formed by sputtering.
(6) The main pole 10 is formed by the plating method.
(7) The overcoat layer 25 is formed by sputtering.
(8) The air bearing surface S is formed by cutting the wafer into row bars, and by polishing and milling the cut surfaces.
(9) By cutting the row bars, individual magnetic head sliders 2 are created.
(10) By positioning the laser diode unit 31 to the core 15 so as to couple laser light with the core 15, the laser diode unit 31 is adhered to the magnetic head slider 2.

In steps (1) to (7), a plurality of magnetic head sliders 2 are formed on the wafer in a lattice pattern. When step (7) is finished, each magnetic head slider has the core 15, the plasmon generator 16, the main pole 10 and the protrusion 19. In step (8), the wafer is cut so as to allow the surface facing the generator front end surface 16a to be a cut plane surface, and is divided into row bars including the plurality of magnetic head sliders 2. The row bar is an aggregate where the magnetic head sliders 2 are arranged in a row or a plurality of rows. After that, the cut plane surface of the row bar is pressed against a rotating polishing board, and is polished. Polishing abrasive grains are embedded into the polishing surface. The cut plane surface of the row bar is further milled, and the air bearing surface S is formed. For the milling, for example, ion milling can be used.

The protrusion 19 has a smaller polishing rate or a smaller milling rate than other portions configuring the air bearing surface S. Specifically, the protrusion 19 has a smaller polishing rate or a smaller milling rate than the leading shield 11, the insulator 18, such as $Al_2O_3$, between the leading shield 11 and the core 15, the main pole 10 and the like. Therefore, when the protrusion 19 has a smaller polishing rate, on the occasion of polishing in the step (8), the protrusion 19 will protrude more than these other parts. Similarly, when the protrusion 19 has a smaller milling rate, on the occasion of milling in step (8), the protrusion 19 protrudes more than these other parts. Thus, the protrusion 19 is formed according to (a) difference(s) in the milling rate and/or the polishing rate. Polishing and milling are performed on the row bars; however, these can be performed on individual magnetic head sliders 2 after the row bars are further divided into individual magnetic head sliders 2.

Figure 6A:
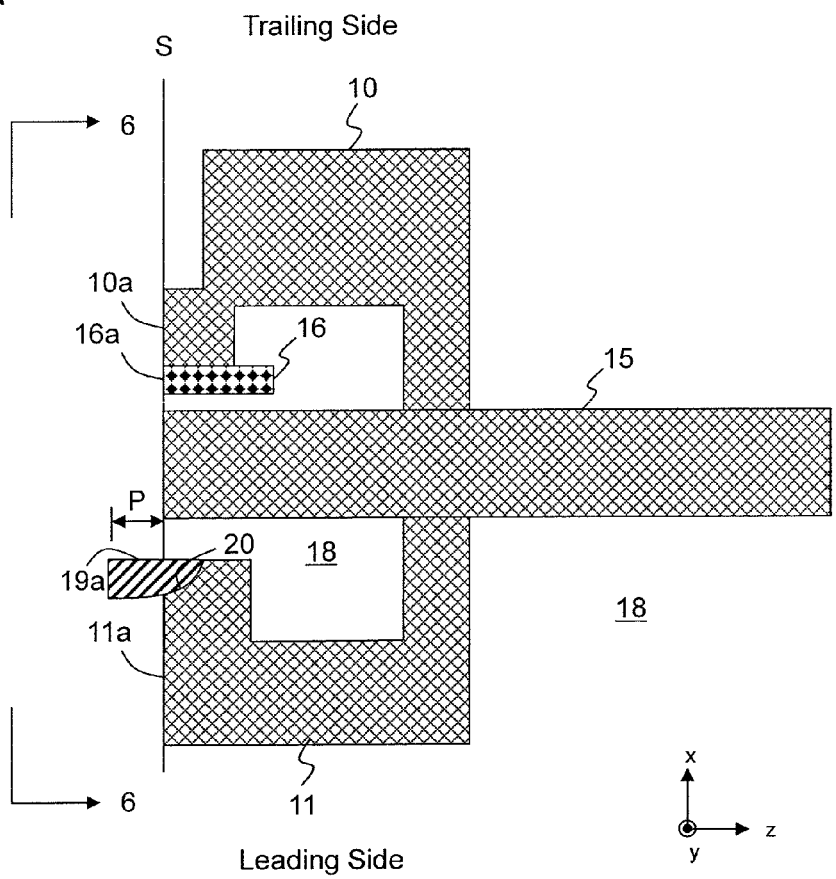
FIG. 6A is a conceptual cross-sectional view of main parts of a thermal assisted magnetic recording head relating to another embodiment.
Figure 6B:
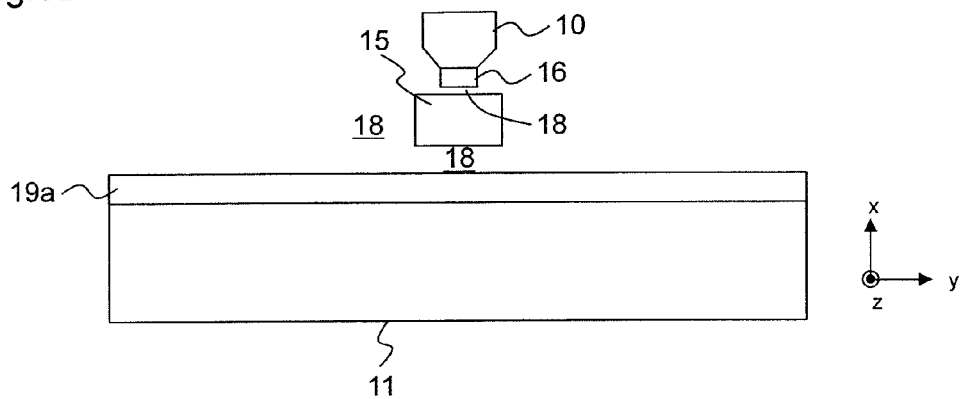
FIG. 6B is a conceptual view showing the ABS of the main parts of the thermal assisted magnetic recording head shown in FIG. 6A.

The protrusion 19 can be provided not at the core 15, but at the leading shield 11. FIG. 6A is a similar figure to FIG. 3A showing another embodiment of the present invention, and FIG. 6B is a schematic view of main parts of the ABS viewed from the line 6-6 of FIG. 6A. The leading shield 11 has a chamfer 20 facing the plasmon generator 16 and the magnetic recording medium 14, and a protrusion 19a is provided at the chamfer 20. The chamfer 20 can be formed, for example, by ion milling after the leading shield 11 is created. An apex of the leading shield 11 is removed to be a curved-state by milling, and the protrusion 19a is formed at the removed portion, for example, by sputtering. This step can be performed between steps (3) and (4). After the polishing and milling in step (8) are performed, the protrusion 19a protrudes from the shield end surface 11a of the leading shield 11 toward the magnetic recording medium 14.

Figure 7A:
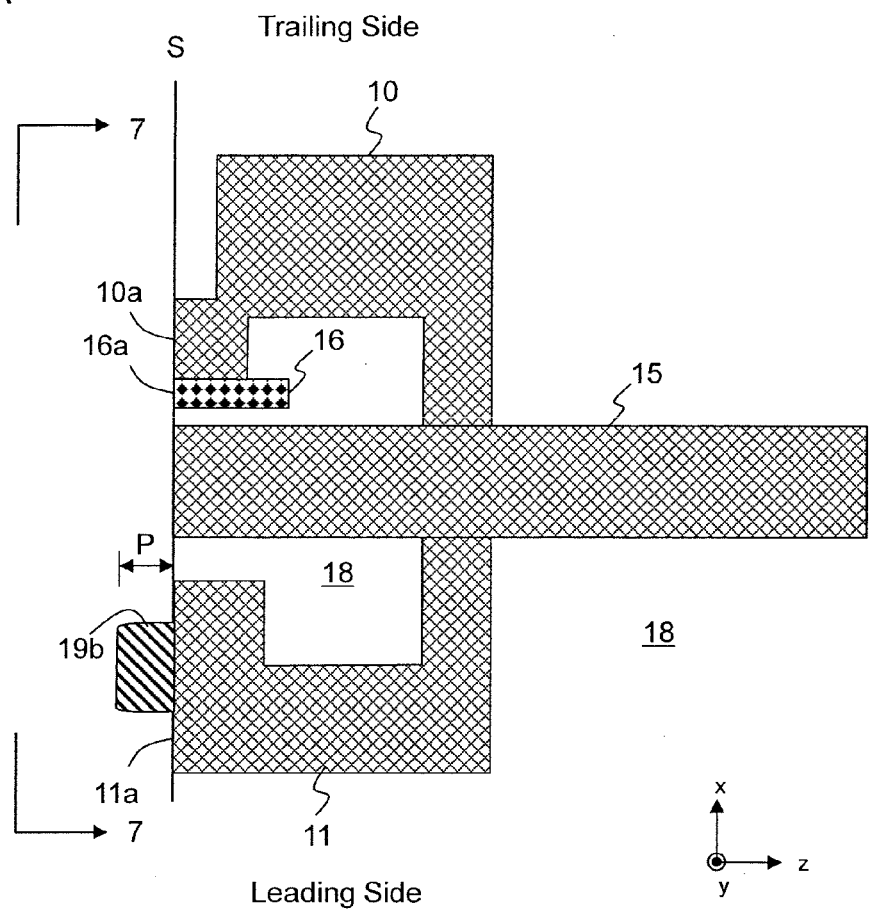
FIG. 7A is a conceptual cross-sectional view of the main parts of a thermal assisted magnetic recording head relating to another embodiment.
Figure 7B:
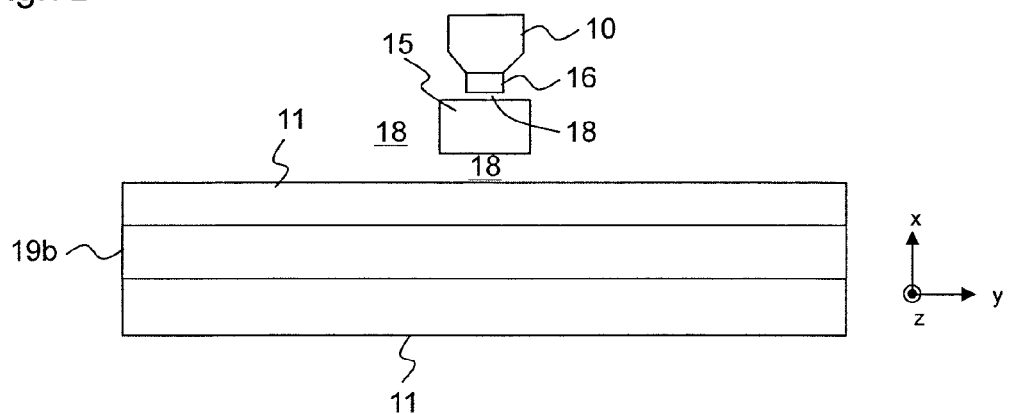
FIG. 7B is a conceptual view showing the ABS of the main part of the thermal assisted magnetic recording head shown in FIG. 7A.

FIG. 7A is a similar figure to FIG. 3A further showing another embodiment of the present invention, and FIG. 7B is a schematic view of main parts of the ABS viewed from the line 7-7 of FIG. 7A. In the present embodiment, after the air bearing surface S of the magnetic head slider is formed, a protrusion 19b can be formed on the shield end surface 11a of the leading shield 11. The protrusion 19 can be formed by sputtering between steps (8) and (9) or between steps (9) and (10). The entire protrusion 19b formed as mentioned above protrudes from the shield end surface 11a of the leading shield 11 toward the magnetic recording medium 14. The present embodiment is characterized by formation of the protrusion 19b on the polished and milled cut plane surface, and the protrusion 19b can also be provided on the end surface 15a of the core 15.

Next, a head gimbal assembly (HGA) where the thermal assisted magnetic recording head is mounted is explained.

Figure 8:
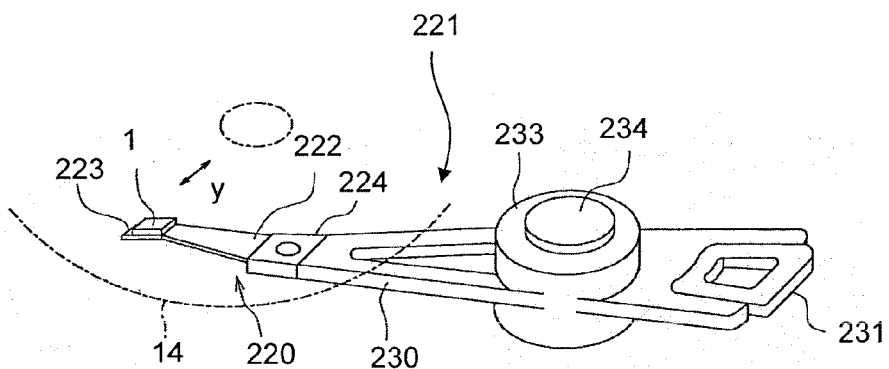
FIG. 8 is a perspective view of a head arm assembly of the present invention.

With reference to FIG. 8, a head gimbal assembly (HGA) 220 includes the thermal assisted magnetic recording head 1 and a suspension 221 that elastically supports the thermal assisted magnetic recording head 1. The suspension 221 has a plate spring-state load beam 222 formed with stainless steel, a flexure 223 provided at one end part of the load beam 222, and a base plate 224 provided at the other end part of the load beam 222. The thermal assisted magnetic recording head 1 is joined to the flexure 223, and provides an appropriate degree of freedom to the thermal assisted magnetic recording head 1. A gimbal part for keeping the position of the thermal assisted magnetic recording head 1 constant is provided at the portion where the thermal assisted magnetic recording head 1 is attached.

The assembly that the HGA 220 is mounted to an arm 230 is referred to as a head arm assembly 221. The arm 230 moves the thermal assisted magnetic recording head 1 in the cross track direction y of the magnetic recording medium 14. A base plate 224 is attached to one end of the arm 230. A coil 231, which is a part of a voice coil motor, is attached to the other end part of the arm 230. A bearing part 233 is provided in the intermediate part of the arm 230. The arm 230 is rotatably supported by a shaft 234 attached to the bearing part 233. The arm 230 and the voice coil motor that drives the arm 230 configure an actuator.

Figure 9:
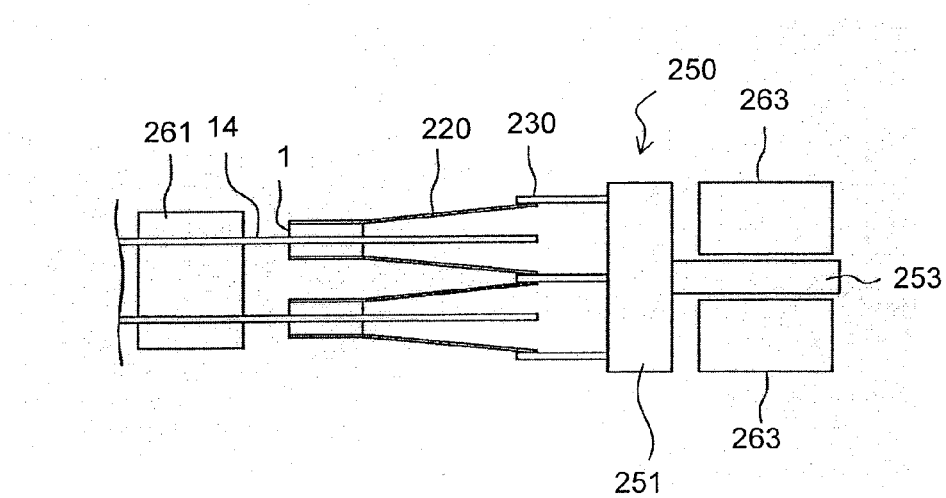
FIG. 9 is a side view of a head stack assembly of the present invention.
Figure 10:
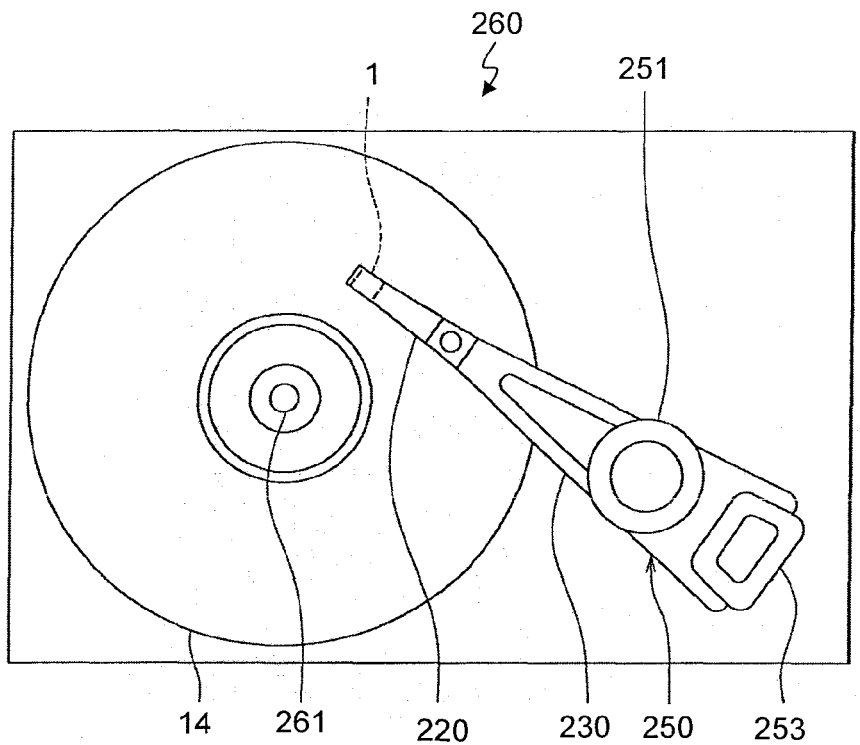
FIG. 10 is a plan view of a magnetic recording device of the present invention.

Next, with reference to FIG. 9 and FIG. 10, a head stack assembly in which the thermal assisted magnetic recording head 1 is incorporated and a magnetic recording device are explained. The head stack assembly is an assembly where the HGA 220 is attached to each arm of a carriage having a plurality of arms. FIG. 9 is a side view of the head stack assembly, and FIG. 10 is a plan view of the magnetic recording device. The head stack assembly 250 has a carriage 251 having a plurality of arms 230. The HGA 220 is attached to each arm 230 so as to be spaced from each other and arranged side-by-side in a perpendicular direction. A coil 253, which is a part of the voice coil motor, is attached to the opposite side of the arm 230 of the carriage 251. The voice coil motor has permanent magnets 263 arranged at opposite positions across the coil 253.

With reference to FIG. 10, the head stack assembly 250 is incorporated into a magnetic recording device 260. The magnetic recording device 260 has a plurality of the magnetic recording media 14 that are attached to a spindle motor 261. In every magnetic recording medium 14, two thermal assisted magnetic recording heads 1 are arranged to be opposite across the magnetic recording medium 14. The head stack assembly 250 except for the thermal assisted magnetic recording heads 1 and the actuator correspond to a positioning device, support the thermal assisted magnetic recording heads 1, and position the thermal assisted magnetic recording heads 1 with respect to the magnetic recording medium 14. The thermal assisted magnetic recording heads 1 are moved in the cross track direction of the magnetic recording medium 14 by the actuator, and are positioned with respect to the magnetic recording medium 14. The thermal assisted magnetic recording head 1 records information into the magnetic recording medium 14 by the magnetic recording element 5, and reproduces the information recorded in the magnetic recording medium 14 by the MR element 4.

Although the desired embodiments of the present invention were presented and explained in detail, readers should understand that various modifications and amendments are possible as long as they do not depart from the effect or the scope of attached claims.

What is claimed is:

1. A thermal assisted magnetic recording head, comprising:
    an air bearing surface (ABS) opposite to a magnetic recording medium,
    a core that can propagate laser light as propagating light,
    a plasmon generator that includes a generator front end surface facing the ABS, and
    a main pole that faces the ABS and emits magnetic flux to the magnetic recording medium, wherein
    the plasmon generator
        is opposite to a portion of the core and extends to the generator front end surface,
        is coupled with a portion of the propagating light that propagates through the core in the surface plasmon mode to generates surface plasmon,
        propagates the surface plasmon to the generator front end surface, and
        generates near-field light (NF light) at the generator front end surface to irradiate the magnetic recording medium, and
    the ABS comprises a protrusion that is closer to the leading side than the generator front end surface in the down track direction, and that protrudes more toward the magnetic recording medium than the generator front end surface when the thermal assisted magnetic recording head is operated.

2. The thermal assisted magnetic recording head according to claim 1, wherein the protrusion protrudes more than the generator front end surface by 0.5 to 2 µm.

3. The thermal assisted magnetic recording head according to claim 1, wherein
    the core is positioned closer to the leading side in the down track direction than the plasmon generator, and
    the protrusion is separated by a distance, which is no less than an interval between the plasmon generator and the core, in the down track direction from the generator front end surface.

4. The thermal assisted magnetic recording head according to claim 1, wherein
    the protrusion is situated at a position of 0.03 to 3 µm in the down track direction from the generator front end surface.

5. The thermal assisted magnetic recording head according to claim 1, wherein the protrusion has a length of 15 µm or more in the cross track direction.

6. The thermal assisted magnetic recording head according to claim 1, wherein the protrusion has a length of 100 µm or less in the cross track direction.

7. The thermal assisted magnetic recording head according to claim 1, wherein the protrusion has a Mohs hardness of 5 or more.

8. The thermal assisted magnetic recording head according to claim 7, wherein
    the protrusion is diamond, diamond-like carbon, boron nitride, titanium, vanadium, chrome, zinc, neodymium, molybdenum, hafnium, tantalum, tungsten, or an oxide or nitride thereof.

9. The thermal assisted magnetic recording head according to claim 1, wherein
    the protrusion passes on a surface of the core opposite to the magnetic recording medium, and extends on both sides of the surface opposite to the magnetic recording medium in the cross track direction.

10. The thermal assisted magnetic recording head according to claim 1, further comprising:
    a leading shield
        that is positioned closer to the leading side than the plasmon generator,
        that is magnetically coupled with the main pole,
        that has a shield end surface facing the ABS, and
        that absorbs magnetic flux returning from the magnetic recording medium at the shield end surface, wherein
    the leading shield comprises a chamfer that faces the plasmon generator and the magnetic recording medium, and that extends in the cross track direction, and
    the protrusion extends on the chamfer.

11. The thermal assisted magnetic recording head according to claim 1, further comprising:
a leading shield
that is positioned closer to the leading side than the plasmon generator,
that is magnetically coupled with the main pole,
that has a shield end surface facing the ABS, and
that absorbs magnetic flux returning from the magnetic recording medium at the shield end surface, wherein
the protrusion is formed on the shield end surface.

12. The thermal assisted magnetic recording head according to claim 1, wherein
the protrusion comprises a smaller milling rate or a smaller polishing rate, or both, than other parts configuring the ABS.

13. A head gimbal assembly, comprising:
the thermal assisted magnetic recording head according to claim 1, and
a suspension that elastically supports the thermal assisted magnetic recording head, wherein
the suspension comprises:
a flexure to which the thermal assisted magnetic recording head is joined,
a load beam having one end connected to the flexure, and
a base plate which is connected to the other end of the load beam.

14. A magnetic recording device, comprising:
the thermal assisted magnetic recording head according to claim 1,
the magnetic recording medium that is positioned opposite to the thermal assisted magnetic recording head,
a spindle motor that rotates and drives the magnetic recording medium, and a device that supports the magnetic head slider and that positions the magnetic head slider with respect to the magnetic recording medium.

15. A manufacturing method for a thermal assisted magnetic recording head that comprises
an air bearing surface (ABS) opposite to a magnetic recording medium,
a core that can propagate laser light as propagating light,
a plasmon generator that includes a generator front end surface facing the ABS, and
a main pole that faces the ABS and emits magnetic flux to the magnetic recording medium, wherein
the plasmon generator
is opposite to a portion of the core and extends to the generator front end surface,
is coupled with a portion of the propagating light that propagates through the core in the surface plasmon mode to generates surface plasmon,
propagates the surface plasmon to the generator front end surface, and
generates near-field light (NF light) at the generator front end surface to irradiate the magnetic recording medium,
the method comprising:
a step of forming the ABS so as to include a protrusion that is closer to the leading side than the generator front end surface in down track direction, and that protrudes more toward the magnetic recording medium than the generator front end surface when the thermal assisted magnetic recording head is operated.

16. The manufacturing method for a thermal assisted recording head according to claim 15, further comprising the steps of:
forming a plurality of head sliders comprising the core, the plasmon generator, the main pole and the protrusion, respectively, on a wafer in a reticular pattern;
cutting the wafer so as to allow a surface facing the generator front end surface to be a cut plane surface, and dividing into row bars including the plurality of magnetic head sliders, or individual magnetic head sliders; and
forming the ABS by polishing and milling the cut plane surface, wherein the protrusion comprises a smaller milling rate or a smaller polishing rate, or both, than other parts configuring the ABS.

17. The manufacturing method for a thermal assisted magnetic recording head according to claim 15, further comprising the steps of:
forming a plurality of head sliders comprising the core, the plasmon generator and the main pole, respectively, on a wafer in a reticular pattern;
cutting the wafer so as to allow the surface facing the generator front end surface to be a cut plane surface, and dividing into row bars including the plurality of magnetic head sliders or individual magnetic head sliders;
polishing and milling the cut plane surface; and
forming the protrusion on the polished and milled cut plane surface.

* * * * *